United States Patent Office 3,292,380
Patented Dec. 20, 1966

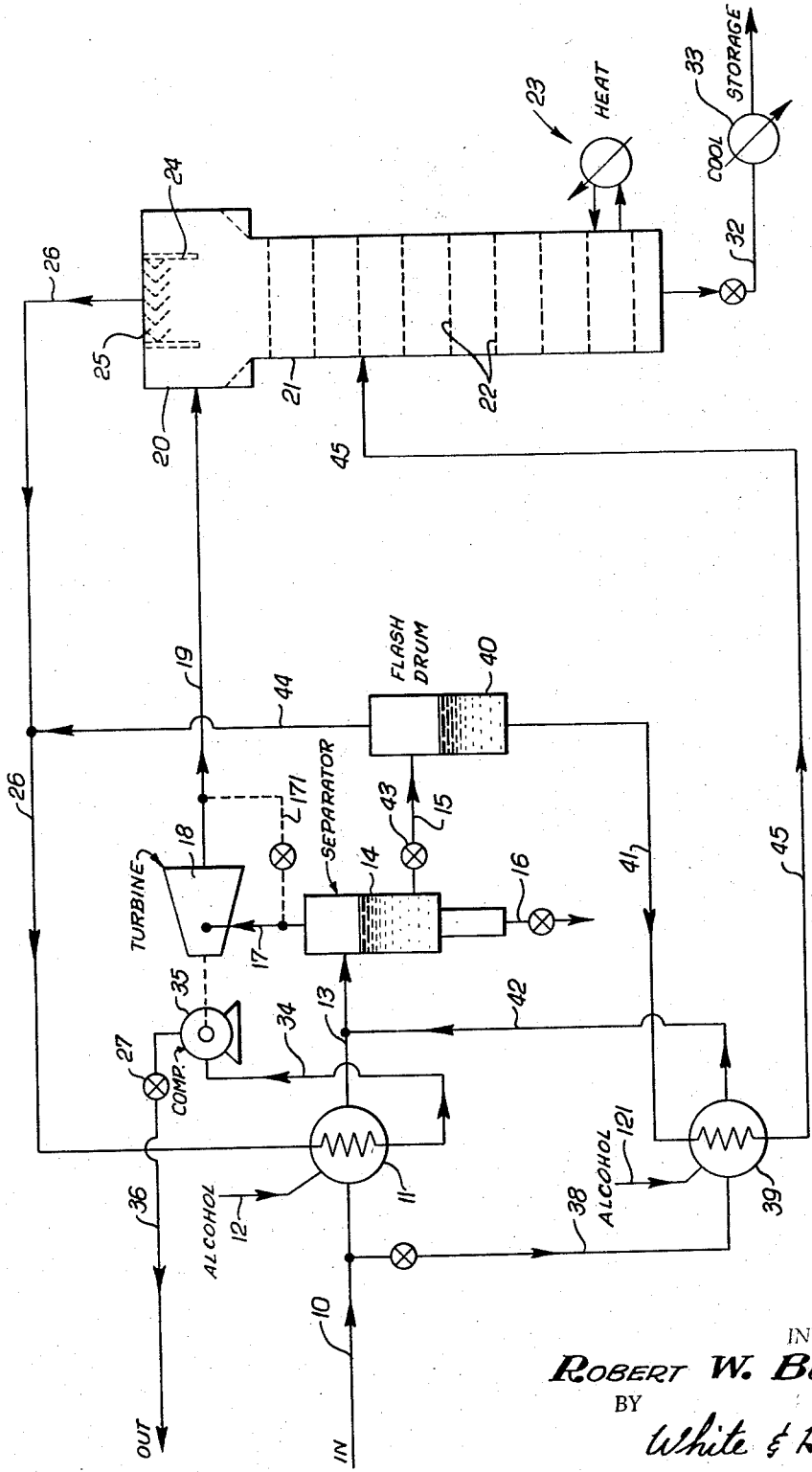

3,292,380
METHOD AND EQUIPMENT FOR TREATING HYDROCARBON GASES FOR PRESSURE REDUCTION AND CONDENSATE RECOVERY
Robert W. Bucklin, Houston, Tex., assignor, by mesne assignments, to Coastal States Gas Producing Company, Corpus Christi, Tex., a corporation of Delaware
Filed Apr. 28, 1964, Ser. No. 363,154
10 Claims. (Cl. 62—20)

This invention has to do with methods and equipment for the treatment of hydrocarbon gases initially at relatively high pressure and containing one or more condensible fractions, for conversion of the gas to low pressure compositionally depleted with respect to such fraction or fractions.

In its practical aspects the invention has for its general object to provide for such conversion of relatively high pressure natural or refinery gas containing methane together with higher boiling fractions typically ethane, propane and heavier, as well as fixed components, to produce predominantly methane effluent at relatively low pressure and of composition suitable for pipe line feed or distribution for such uses as fuel gas.

Involved in the overall requirements of the high pressure gas conversion, are that its pressure be reduced to distribution or use levels, and that separation of the gas fraction or fractions to be condensed occur at reduced pressure and under low temperature conditions assuring efficiency and economy in the plant operation, as well as maximized recovery of condensate saleable e.g. as LPG. However certain practical or fixed requirements may mitigate against achieving these objectives under circumstances such as those here contemplated, and particularly where the desired consumer or line pressure of the treated gas is above those pressures at which condensibles may be most efficiently stripped from the gas.

My general object is to provide a novel system whereby reduction of the feed gas pressure may be accomplished simply and directly to a desired super-atmospheric distribution line pressure, and stripping out of condensate may occur under low temperature and at pressures essentially independent of limitation by the plant outlet line pressure. Specifically contemplated is provision for most efficiently conducting an appropriate low temperature stripping operation at pressures lower than such outlet line pressure, and then to restore the gas to that pressure, by utilizing energy inherent in the system for recompression while expanding initially cooled gas to very low stripping temperature.

In accordance with the invention, high pressure feed gas initially cooled well below 32° F. is further adiabatically cooled and expanded through a turbine to a pressure below product line pressure, and which is selected and controlled to conform with low pressure and low temperature conditions best suited to most efficient stripping and condensate recovery. Such stripping pressure is subject to variation depending upon such considerations as the kind or extent of liquid recovery desired in particular instances or with different gas compositions, as well as other possible equipment or processing limitations. Restoration of the gas from stripping pressure to outlet line pressure is accomplished by compression utilizing energy developed by the expansion turbine for recompression, thus achieving the principal advantages of recovering energy inherent in the system by reason of the gas expansion, employing the recompression load as a means of stabilizing the turbine operation, and dropping the initially cooled gas temperature to low stripping level.

Contemplated also in conjunction with the expansion, stripping and recompression cycle are provisions for initial cooling and partial condensation of the feed gas and any moisture present at below 32° F. temperature, by exchange with the cold stripper overhead and in advance of its recompression, as well as for flash vaporization of condensate and delivery of resulting condensate and gas respectively to the stripping stage and compressor.

The invention further aims to control hydrate formation in a system as outlined, by injection into the gas and separation therefrom an additive such as methanol, ethanol or propanol, as later described.

All the features and objects of the invention, as well as the details of an illustrative embodiment thereof, will be understood more fully and to better advantage from the following description of the accompanying flow sheet.

As indicated, the invention has to do with pressure reduction and partial liquefaction of hydrocarbon natural or refinery gases initially at relatively high pressure, typically within the range of 1,500 to 600 p.s.i., and whose compositions principally are methane together with liquefiable fractions. Ordinarily such gases may range in composition from about 80 to 95 mole percent methane, 3 to 7 mole percent ethane, 1.0 to 5.0 percent propane and higher boiling hydrocarbons, with variable contents of nitrogen, carbon dioxide and other acidic impurities such as hydrogen sulfide. Where desirable, the high pressure gas used for purposes of the invention, may be pretreated for the removal of acidic or other impurities.

Referring to the accompanying flow sheet, high pressure gas fed to the system through line 10 passes through one or more exchangers 11 which serve to precool the feed by heat transference to the later described cold gas going to the compressor. Where the feed gas contains moisture, the temperature drop in exchanger 11 may tend to produce hydrate formation, prevention of which may be accomplished by the introduction of methanol, ethanol or propanol to the gas stream in the exchanger through line 12. The quantity of alcohol so introduced will be sufficient also to depress the freezing temperature of the aqueous alcohol to permit its (and therefore the gas water content) withdrawal from the separator 14. From heat exchange, the resulting high pressure gas, aqueous alcohol, and some hydrocarbon condensate are discharged through line 13 to separator 14, the latter being of any suitable type permitting of phase separation of hydrocarbon condensate which is withdrawn through line 15, and hydrous alcohol which is taken through line 16 to be rejected or conditioned for reuse.

The high pressure gas effluent from separator 14 passes through line 17 at below 32° F. temperature to a turbine, diagrammatically indicated at 18, which is of a known type capable of tolerating condensate resulting from expansion cooling of the gas in passing through and driving the turbine. Suitable for such usage is a type and design of expansion gas turbine, and combination turbine and compressor, manufactured by Rotoflow Coroporation of Los Angeles, California, sold under the name Turbo Expandor Compressor. The high pressure gas undergoes expansion and adiabatic cooling in driving and passing through the turbine 18, to a relatively low discharge pressure and cold temperature in line 19 which permits of more effective and economical separation or stripping than at the feed pressure or ultimate product line pressure. In this manner, the later described stripping operation may be conducted at temperatures below —100° F.

The turbine gaseous and condensate effluent mixture in line 19 may be subjected to stripping by any suitable methods or equipment capable of depleting the low pressure gas of such salable prduct components as ethane, propane, and heavier, which are not desired in the output gas. As a preferred though typical stripping practice, the line 19 stream may be discharged into the top separator section 20 of a vertically extended stripping column 21 which may contain suitable means, such as conventional plates or trays 22, for intimately contacting down-flowing condensate with gases and vapors rising from the bottom reboiler generally indicated at 23. Merely as illustrative, the separator head 20 is shown to be circularly baffled at 24 to throw out condensate which flows down through the column, and additional baffling at 25 to remove liquid entrainment from the column overhead gas withdrawn through line 26.

In the particular system illustrated, the stripper column may operate to remove substantially the entire propane content of the feed gas as well as considerable quantities of ethane. Where substantially complete ethane and heavier removal are desired, the stripper may be designed and operated accordingly in accordance with known practices. For purposes of stripper pressure control, back pressure regulating valve 27 is installed in the compressor discharge line 36. The stripper column may be provided with any suitable type of bottom heater or reboiler conventionaly indicated at 23, which serves to vaporize lighter fractions from the column LPG taken through line 32 and cooler 33 to storage.

The cold stripper overhead is taken through line 26 through exhanger 11 and thence through line 34 to compressor 35 which is driven by the turbine 18 and may be directly coupled thereto as a unit. The quantity and pressure differential of the feed gas at the high line 17 and low line 19 sides of the turbine, are such that expansion energy imparted to the turbine will drive compressor 35 and compress the line 34 gas to a discharge pressure in line 36 beyond valve 27 as desired for transmission for use as fuel or for other purposes. Optionally, and where for any reason it may be desired to bypass the turbine 18 with a portion of the line 17 gas, valved line 171 may be provided for this purpose. In general, the operating pressure of the stripper column 21 and the pressure in line 26 may range between about 30 to 200 p.s.i. below the gas outlet pressure in line 36, and the feed gas quantity and pressure differential across the turbine 18 will satisfy the energy requirements of compressor 35 to elevate the stripper overhead to desired product line pressure. Should particular situations be encountered demanding line 36 pressures higher than those obtainable alone by the turbo compressor the product gas may be further independently compressed, but the described turbine compression will retain its benefits in contributing to the total compression while serving the purposes of feed gas expansion and cooling.

In further reference to the drawing, a portion of the feed gas, typically between about 5 to 30 percent, may be discharged through line 38 for cooling in exchanger 39 by heat transference to condensate discharge from flash drum 40 through line 41 and the exchanger. As before, hydrate formations in the exchanger may be prevented by alcohol introduction at 121. The precooled partial feed gas and any condensate produced in exchanger 39, are discharged through line 42 for delivery with line 13 gas to separator 14. The separator hydrocarbon condensate undergoes expansion and flash vaporization at valve 43 in flowing through line 15 to the flash drum wherein the liquid separates for withdrawal through line 41 and the gaseous overhead is taken through line 44 to be combined with the line 26 gas going to the compressor. Exchanger 39 has some aspects of a preheater or stripping column side heater, in heating and partially vaporizing the flash drum condensate for delivery through line 45 to an appropriate intermediate location in the stripper column 21.

To cite typical operating conditions, the line 10 feed gas at a pressure of 750 p.s.i.g., contains about 90 mole percent methane, 5 percent ethane and 2.5 percent propane and heavier. The combined feed gas streams enter separator 14 at a temperature of about —70° F. with slight pressure reduction so that the turbine 18 is driven at about the feed pressure. At valve 43 the liquid is expanded to the flash drum 40 pressure of about 250 p.s.i. at a temperature of about —120° F. Condensate from the flash drum is fed through line 45 to the stripper column at a temperature of about 20° F. In passage through the turbine, the line 19 and stripper column gas pressure is reduced to about 235 p.s.i. at about —135° F. temperature, and for substantially 90 percent propane recovery through line 32, the column is operated at a bottom temperature of about 140° F. The stripper column overhead goes to the compressor 35 through line 26 at about the column pressure, or somewhat below, and the compressor operates to elevate the stripped gas pressure for delivery from the system through line 36 at a pressure of 300 p.s.i.

I claim:
1. The method of treating relatively high pressure hydrocarbon feed gas containing methane and condensable components to produce output gas at relatively low pressure, that includes:
  (a) cooling said high pressure gas to below 32° F.,
  (b) expanding the cooled gas through a turbine to produce a gas-condensate mixture at a temperature below about —100° F.,
  (c) delivering the gas-condensate mixture at a temperature below about —100° F. to a stripping column,
  (d) stripping the condensate to remove a condensable component thereof at a pressure below the output gas pressure,
  (e) flowing gas from the stripping column in heat exchange relationship with the feed gas, and
  (f) recompressing gas from the stripping column, after it has been heat exchanged with the feed gas, by the energy output of said turbine to constitute said output gas.

2. The method of claim 1, in which said hydrocarbon gas contains ethane and propane, and propane is removed therefrom in said condensible component.

3. The method of claim 1 in which condensate resulting from the heat exchange of step (e) is subjected to flash vaporization to produce (i) a gaseous effluent which is combined with gas going to the recompression, and (ii) a liquid which is delivered to the stripping column for stripping.

4. The method of claim 3 in which a portion of the feed gas is heat exchanged with the liquid produced by the flash vaporization and such feed gas is thereafter passed to the turbine.

5. The method of claim 1 in which an alcohol is introduced into the feed gas to prevent hydrate accumulation during its heat exchange with gas from the stripping column.

6. The method of claim 5 in which said alcohol is separated with moisture from the gas before the passage of the gas to the turbine.

7. Apparatus for treating relatively high pressure hydrocarbon feed gas and condensable components to produce output gas at relatively low pressure that includes:
  (a) a stripping column
  (b) a gas-driven turbine and gas compressor driven by said turbine
  (c) means for delivering the fed gas to the turbine to drive the turbine and produce gas and condensate at a pressure lower than the pressure of said output gas,
  (d) means for delivering said gas and condensate from the turbine to the stripping column,
  (e) means for passing gas from the stripping column in heat exchange relationship with the feed gas,
  (f) means for recompressing gas from the stripping column, after it has been heat exchanged with the feed gas, by the energy output of said turbine to constitute said output gas,
  (g) means for collecting and expanding feed gas condensate from the heat exchange of item (e) into a flash chamber,
(h) means for passing gas from the flash chamber to stripped gas flowing from the stripping column, and
(i) means for passing condensate from said flash chamber to the stripping column.

8. Apparatus according to claim 7, comprising also means in the means of (e) of claim 7 for controlling the stripping column pressure.

9. Apparatus according to claim 7, comprising also means for passing said flash chamber condensate in indirect heat exchange with a portion of the feed gas going to the turbine.

10. Apparatus according to claim 7, in which said gas from the flash chamber is combined with the stripped gas before its passage through the first mentioned exchanger means.

References Cited by the Examiner
UNITED STATES PATENTS

| | | | |
|---|---|---|---|
| 2,494,120 | 1/1950 | Ferro | 62—38 X |
| 2,522,640 | 9/1950 | Ruhemann. | |
| 2,608,070 | 8/1952 | Kapitza. | |

NORMAN YUDKOFF, *Primary Examiner.*

V. W. PRETKA, *Assistant Examiner.*

Disclaimer and Dedication

3,292,380.—*Robert W. Bucklin*, Houston, Tex. METHOD AND EQUIPMENT FOR TREATING HYDROCARBON GASES FOR PRESSURE REDUCTION AND CONDENSATE RECOVERY. Patent dated Dec. 20, 1966. Disclaimer and dedication filed Apr. 20, 1970, by the assignees, *Garrett Tucker*, *Sidney Johnson*, and *Melvin Fincke*.

Hereby disclaim and dedicate said patent to the Public.

[*Official Gazette July 7, 1970.*]